UNITED STATES PATENT OFFICE.

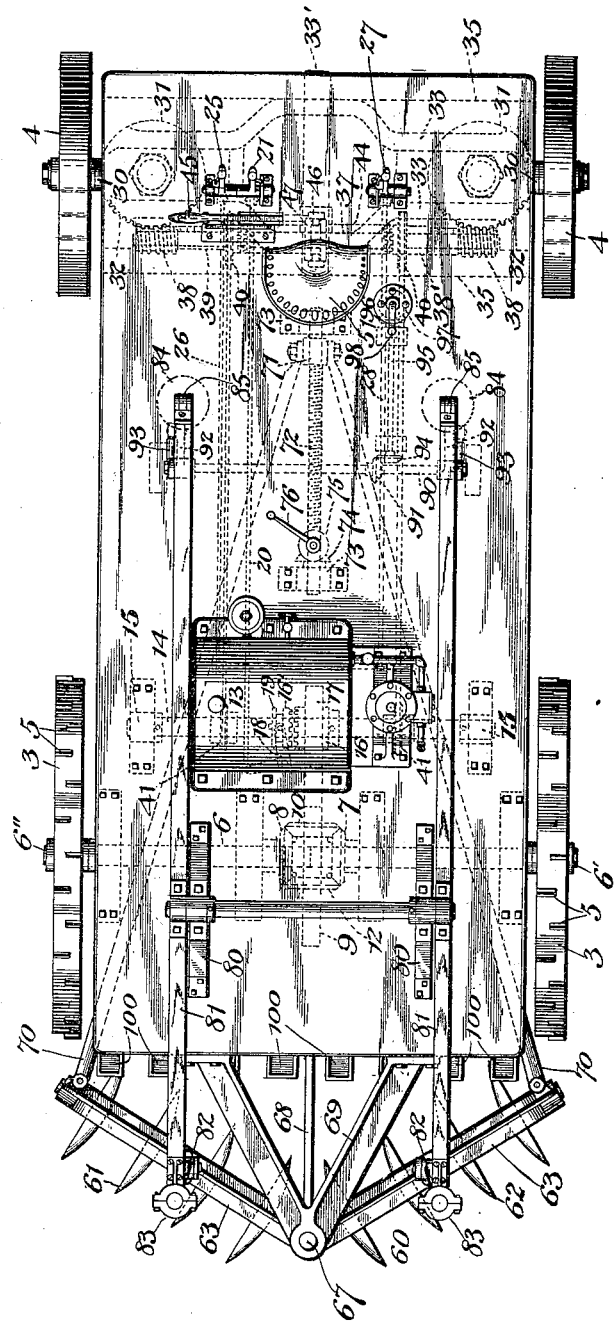

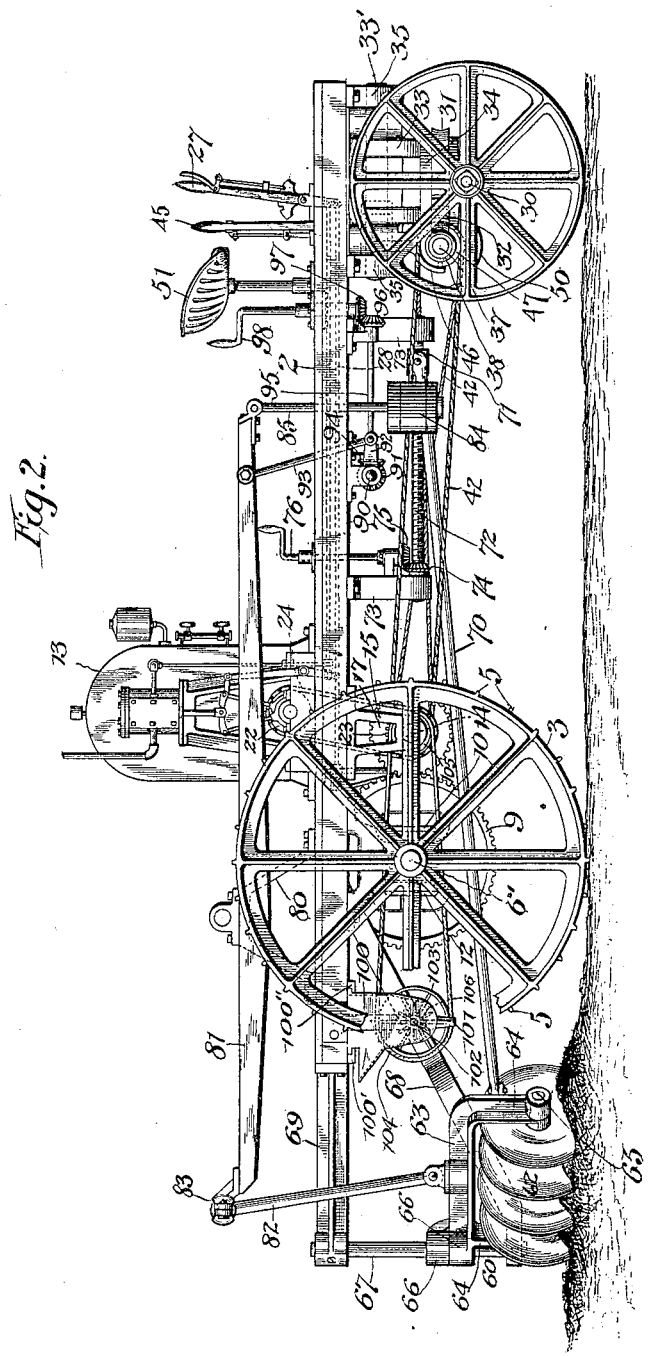

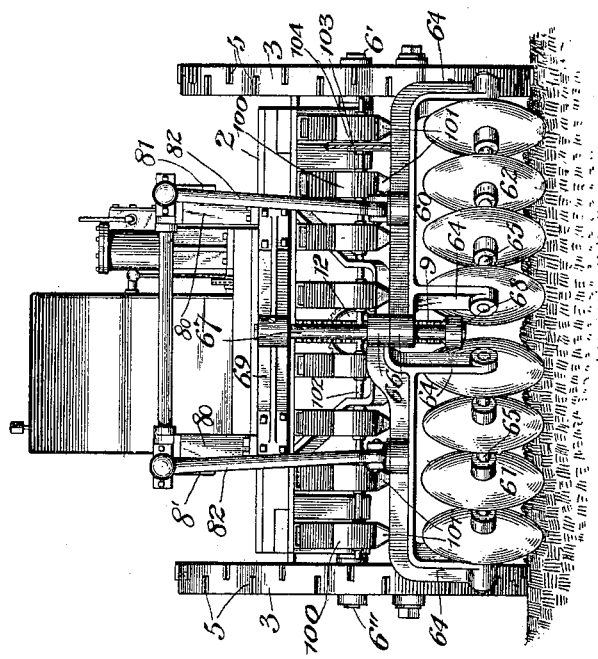

RICHARD J. GATLING, OF NEW YORK, N. Y.

MOTOR-DRIVEN PLOW.

SPECIFICATION forming part of Letters Patent No. 654,243, dated July 24, 1900.

Application filed September 15, 1899. Serial No. 730,552. (No model.)

*To all whom it may concern:*

Be it known that I, RICHARD J. GATLING, a citizen of the United States, residing in New York, in the county of New York and State of New York, have invented certain new and useful Improvements in Motor-Driven Plows, of which the following is a specification.

This invention relates to agricultural implements, and more particularly it relates to motor-driven plows.

An object of the invention is to provide a motor-driven agricultural implement having one or more sets of disk-shaped soil-working devices, the invention being shown embodied in the present instance as a motor-driven plow having a gang of disk plows.

One of the primary objects of the invention is to provide a mechanically-driven agricultural implement having a series of soil-working disks usually located in and usually comprising a plurality of sets and adjustable into various positions, according to the work to be performed, and adapted to be raised out of and lowered into their working positions.

A further object of the invention is to provide, in connection with the present improvement, various details of construction which when organized as herein shown and described permit the vehicle to perform its work in an efficient and highly-superior manner.

In the drawings accompanying and forming part of this specification, Figure 1 is a top view of this improved motor-driven disk plow. Fig. 2 is a side view thereof. Fig. 3 is a front end view thereof, and Fig. 4 is a rear end view of the same.

Similar characters of reference designate like parts in all the figures of the drawings.

This motor-driven disk plow comprises in a general way some suitable body and running-gear, a gang of disks, (shown herein comprising two sets,) means for adjusting the disks at various angles, means for raising and lowering the disks and for determining the depth of their work, and mechanically-operative means for imparting motion to said vehicle, together with such mechanism as may be necessary to control the operation of the driving means and the proper operation of the vehicle.

As a preface to a further description of this improved motor-driven plow I desire to state that any suitable body and running-gear may be used, if desired, and that the structure may be used for various purposes. For instance, instead of carrying disk plows it may carry disk harrows or other implements adapted to be connected and effectively operated by a vehicle of this character.

The present motor-driven plow comprises in one form thereof, and which may be its preferred form, if desired, some suitable framework or body, shown herein as a platform 2, mounted on suitable running-gear. The running-gear in the present instance comprises a pair of drivers or rear wheels 3 and a pair of front or steering wheels 4. Each of the drivers is provided with suitable projections 5 on its periphery to prevent the slipping of the same on the ground. Each driving-wheel is suitably mounted on and shown rigidly connected with an axle 6, shown herein as a two-part axle, each member 6' 6" thereof carrying one of said driving-wheels. This two-part axle is suitably journaled on the under side of the platform 2, and each member thereof carries at its inner end a bevel-gear 7 8, rigidly secured thereto. For imparting motion to said two-part axle, and thereby the driving-wheels, a spur-gear 9 is shown loosely mounted on said axle 6, the end of each member 6' 6" of the axle projecting into the gear-hub. Rotatably carried by this spur-gear 9 intermediate its hub and periphery is a pair of bevel-gears 10 12, carried on short shafts journaled in said spur-gear and meshing with the bevel-gears 7 and 8, carried by the two-part axle. By this construction it will be seen that an equalizing means is provided whereby when one of the driving-wheels meets with an obstruction the other driving-wheel may continue in operation without the breakage or the strain of the mechanism in a manner readily understood. Such an obstruction occurs, for instance, in the turning of the vehicle, whereby one of such wheels may act as a pivot for the turning of the vehicle, thereby to permit such vehicle to be turned in a comparatively-narrow space. For imparting motion to these driving-wheels a suitable motor 13 is provided. While various forms of motors may be used—such as electric, air, or steam—I prefer to use a gasolene-motor or one which can be run by the use of kerosene-oil, since this material can be more readily obtained and carried in those sections of the country where my motor is particularly adapted for use—namely, the large farming sections throughout the West.

A particular description of the motor mechanism is not deemed necessary herein, since it forms no inventive part of the present improvement.

Supported on the body, preferably at the under side thereof, is a driving-shaft 14, mounted in suitable journals 15. Loosely mounted on this shaft is a clutch member 16, carrying a spur-gear 17, in mesh with the spur-gear 9, mounted on the driving-wheel axle 6. Splined to this driving-shaft 14 for rotary movement therewith and for shiftable movement longitudinally thereof is the other clutch member 16'. For operating this clutch member 16' suitable means is provided, shown comprising an angle-lever 18, having a bifurcated end in engagement with a collar 19 of the shiftable clutch member 16', the connection being such that said clutch member can rotate with the shaft. This angle-lever is in connection by a suitable connector 20 with a clutch-controlling lever 21, located in position adjacent to the seat of the operator.

The motor is shown provided with a sprocket-wheel 22 in connection with a like sprocket-wheel 23, fixed to said driving-shaft 14 by means of a sprocket-chain 24.

For controlling the operation of the motor a starting-lever 25 is provided and which is also located in position adjacent to the seat of the operator and is in connection with the motor by a suitable connector 26.

By the organization just described it will be readily seen that the motor may be started and the driving-shaft 14 rotated without driving the vehicle and that after starting the motor the vehicle may be driven by the shifting of the shiftable clutch member 16' into position to engage the loosely-mounted clutch member 16, whereby the spur-gears 9 and 17 will operate the driving-wheels.

Since it is desirable oftentimes to reverse the vehicle, a suitable reversing-lever 27, likewise located in position adjacent to the seat of the operator, is provided and shown in connection with the motor by a connector 28, whereby the motor may be reversed to rotate the driving-shaft 14 in the opposite direction, and consequently the driving-wheel axle and the wheels mounted thereon.

In the present construction the steering-wheels 4, which are of such diameter that they may be readily turned under the platform 2 of the vehicle, are shown rotatably mounted on a two-part axle comprising a pair of short shafts 30, each terminating in a disk-shaped member 31, having a part of its periphery formed as a worm-wheel 32. For carrying these worm-wheel members a suitable bolster 33 is provided, the ends of which terminate in disk-shaped plates 34, to which the worm-wheel members 31 are pivotally bolted. This bolster 33 is shown pivotally secured by a bolt 33' intermediate a pair of cross-irons 35, bolted at the ends thereof to the under side of the platform, whereby the wheels may shift relatively to the body to adjust themselves to any inequalities in the ground. Mounted on the under side of the platform, adjacent to the front wheels, is a worm-shaft 37, provided at each end thereof with a worm 38 in engagement with the worm-wheels 32. Loosely mounted on this shaft for rotation independently thereof is a pair of clutch members 38 and 39, each carrying a pulley 40 in connection with a like pulley 41, mounted on the driving-shaft 14 by suitable driving belts or ropes 42, one of which driving-ropes is shown crossed, whereby one of said pulleys 40 will be rotated in one direction while the other is rotating in the opposite direction, so that said worm-shaft may be turned in either direction, according to which of the loosely-mounted clutch members 38' and 39 is engaged by the shiftable clutch member about to be described. Splined on this worm-shaft 37 for rotary movement therewith and for shiftable movement longitudinally thereof is a clutch member 44, shown herein as a sleeve having each end thereof formed as a clutch and adapted to engage one or the other of the loosely-mounted clutch members 38' and 39, according to the direction in which said shiftable clutch member 44 is operated. For throwing this clutch member into engagement with one or the other of said loosely-mounted clutch members 38' and 39 suitable means is provided, shown herein as a steering-lever 45, pivotally mounted on the bolt 33' and having a depending bifurcated arm 46 in engagement with a grooved collar 47, carried by said shiftable clutch member 44, whereby on shifting said steering-lever the clutch member 44 will be operated in one or the other direction to engage one or the other of the loosely-mounted clutch members 38' and 39, whereby motion from the driving-shaft 14 will be imparted to the worm-shaft 37 through the medium of the clutch members 38' and 39 in one or the other directions, according to which loosely-mounted clutch member is engaged, whereby the steering-wheels 4 will be simultaneously shifted, one thrown rearwardly and under the vehicle-body and the other forwardly. Carried on one of these loosely-mounted clutch members is a suitable driving-pulley 50, (see Fig. 3,) which may be connected with any suitable mechanism to be operated, whereby the motor-vehicle may be used as a driving medium for operating other machinery. A suitable seat 51 is shown in position on the body to enable the operator to control the various operating-levers.

Shown supported by the vehicle, preferably at the rear end thereof, is a gang of adjustable disk plows 60, shown herein comprising two sets 61 and 62, each set supported by a suitable bracket or carrier 63. Each of these carriers is provided with depending members 64, forming bearings for the axle 65 of the disk plows, and with a sleeve 66 for the reception of a rod 67, supported at its lower end by an arm 68, the upper end of which is bolted to the under side of the platform, the upper end of said rod being supported by a bracket 69, bolted to the rear end of said platform.

To maintain the disk plows in their adjusted positions, the outer ends of the carriers 63 are shown pivotally secured to connectors 70, the inner ends of which connectors terminate in an internally-threaded sleeve 71, supported on a screw-shaft 72, journaled in suitable depending brackets 73 at the under side of the platform. This shaft carries a bevel-gear 74, in mesh with a bevel-gear 75, carried by a crank 76, the handle of which is located above the platform 2, whereby on turning this crank 76 the sleeve 71 will be shifted by the shaft to thereby adjust the two sets of disk plows into any desired position relatively to each other—angular or otherwise. This construction, moreover, also forms a rigid connection between the vehicle-body and the outer ends of the disk carriers, thereby to prevent swinging movement or the play thereof while in use. For the purpose of raising and lowering said disk carriers, and thereby the disk plows, and also for the purpose of assisting in determining the depth of cut thereof suitable means is provided, shown herein as a weighted or counterbalanced means. This means is shown in duplicate, so that a description of one is deemed sufficient.

Pivotally secured to a suitable support 80 on the upper side of the platform 2 is a beam or arm 81, one end of which is connected with a disk-plow carrier 63 by a rod 82, having a ball-and-socket joint 83 at its upper end and a rotary joint at its lower end, whereby the carriers may be adjusted into any desired position. Carried at the opposite end of this beam is a counterbalancing-weight 84, which weight is shown supported below the platform 2 by a rod 85 and may consist of a plurality of removable weights or may be so located as to have the same adjustable or shiftable, thereby to increase or decrease its efficiency. This weight tends to counterbalance the disk plows and thereby facilitates the quick and easy adjustment of the same.

For adjusting the beams 81 suitable means is provided, shown herein as a crank-shaft 90, carrying a bevel-gear 91. Each of the crank-arms 92 is is in connection with one of said beams 81 by a suitable connector 93. Meshing with this bevel-gear 91 is a bevel-gear 94, mounted on a shaft 95 at the under side of the platform and carrying a second bevel-gear 96, in mesh with a bevel-gear 97, carried by a crank 98, the handle of which is located above the platform 2 and adjacent to the seat of the operator. On the operation of this crank it will be seen that the beams are raised or lowered, as the case may be, thereby to raise or lower the disk plows, the rod 67 constituting a means on which the carriers are shifted.

In practice the carriers may be readily removed from the vehicle-body to permit other working implements to be assembled in place thereof, or the disk plows may be removed from the carriers for a similar purpose. I desire to state also that both carriers may be raised and lowered, if desired, by the same beam instead of having independent instrumentalities for this purpose.

In some cases it is desirable to plant or sow seed simultaneously with the working of the soil, and for this purpose I have provided a suitable automatic feed device comprising a series of adjustable hoppers 100, located in position on the vehicle to permit the same to be readily filled and each terminating at the under side thereof in a spout 101, one adjacent to each of the disk plows. These hoppers are supported by guideways 100' and 100", whereby they can be adjusted so that the spouts thereof will be brought into proper position relative to the plows when the latter are adjusted to their various angular positions. Extending through these hoppers is a shaft 102, carrying a pulley 103, in connection by a suitable belt or rope 104 with a pulley 105, mounted on the driving-shaft 14. Located in each of these hoppers, above the spouts thereof, and splined to the shaft 102, so as to permit adjustment with the hopper, is a feeding device 106, shown herein having a series of compartments, each adapted to receive a certain amount of seed and discharge the same through the spout when the device is rotated into position to have the compartments thereof in communication with such spout. By this organization there will be delivered from each hopper and in front of each soil-working device a predetermined quantity of seed as each compartment is rotated into position to communicate with the spout.

Having described my invention, I claim—

1. In an agricultural implement, the combination, with a frame or body, of a plurality of carriers supported thereby; one or more soil-working disks supported by each of said carriers; means for raising and lowering each of said carriers and comprising a shiftable member; and rotatable means for raising and lowering said shiftable member.

2. In an agricultural implement, the combination, with a frame or body, of a gang of disk-shaped soil-working devices comprising two sets; a carrier for each of said sets; a pair of beams pivotally mounted on said body; and means for raising and lowering said beams thereby to raise and lower the soil-working devices.

3. In an agricultural implement, the combination, with a frame or body, of a plurality of carriers supported thereby; one or more soil-working disks supported by each of said carriers; shiftable means connected with said carriers; a weight in position to control the working of said disks; and means for raising and lowering said shiftable means thereby to raise and lower said disks.

4. In an agricultural implement, the combination, with a frame or body, of a plurality of carriers connected with said body; one or more soil-working disks supported by each of said carriers; a connector secured to each of said carriers; and means for shifting said connectors and thereby the disks into various positions relatively to the path of the body.

5. In an agricultural implement, the combination, with a frame or body, of a gang of disk-shaped soil-working devices supported by said body and comprising two sets; a single means for adjusting the two sets of devices into various positions relative to the path of the vehicle; and a single means for raising and lowering all of said sets of devices together out of and into their working positions respectively and independently of said frame or body.

6. The combination, with a vehicle-body and its running-gear, of a motor carried by the vehicle, for imparting motion thereto; a pair of carriers supported by said vehicle; a set of disk-shaped soil-working devices mounted on each of said carriers; a pair of connectors jointed to said carriers and shiftably secured to said body; and means for shifting said connectors, and thereby the working devices, into various positions relatively to the path of the vehicle.

7. The combination, with a vehicle-body and its running-gear, of a motor carried by the vehicle, for imparting motion thereto; a gang of soil-working devices comprising two sets; a pair of carriers supported on the vehicle, for carrying said working devices; means for adjusting the carriers, and thereby the working devices, into various positions relatively to the path of the vehicle, and comprising a pair of connectors having an interiorly-threaded sleeve; a worm-shaft in engagement with said sleeve; and means for rotating said worm-shaft.

8. In an agricultural implement, the combination, with a frame or body, of one or more sets of soil-working disks supported thereby; means for raising and lowering each of said sets of soil-working disks and comprising a pivotally-supported member; means for shifting said member; and means for adjusting each of said sets of soil-working disks into various positions relatively to the path of the body.

9. The combination, with a motor-driven vehicle, of a plurality of soil-working disks supported by said vehicle for shiftable movement into and out of their working positions, and for movement into various positions relative to the path of the vehicle; connectors in operative connection with said soil-working disks; means for operating said connectors to control the movement of said disks; and pivotally-supported horizontally-located means for raising and lowering said disks.

10. The combination, with a vehicle-body and with its running-gear, of a motor carried by the vehicle, for imparting motion thereto; one or more sets of disk-shaped soil-working devices supported by the vehicle; and counterbalanced means connected with said soil-working devices; means including gear mechanism for raising and lowering said devices.

11. The combination, with a vehicle-body and its running-gear, of a motor supported by the vehicle, for imparting motion thereto; a rod carried by said body; a pair of carriers shiftably mounted on said rod; a set of soil-working devices supported by each of said carriers; and means for raising and lowering said carriers and thereby the working devices.

12. The combination, with a vehicle-body and its running-gear, of a motor supported by said vehicle, for imparting motion thereto; a carrier supported by said body; a set of soil-working devices mounted on said carrier; and means for raising and lowering said carrier and comprising a shiftable member, a crank-shaft in operative connection therewith, and means for operating said crank-shaft to raise and lower said shiftable member and thereby the working devices.

13. The combination, with a vehicle-body and its running-gear, of a motor supported by said vehicle for imparting motion to said running-gear; a carrier supported by said body; a set of soil-working devices mounted on said carrier; a beam pivotally supported on said body and connected to said carrier; a changeable weight supported by said beam; and means for raising and lowering said beam and thereby the working devices.

14. The combination, with a vehicle-body and its running-gear, of a motor supported by said vehicle, for imparting motion thereto; a gang of disk-shaped soil-working devices comprising two sets thereof; a carrier for each of said sets; a pair of beams pivotally mounted on said body; and means for raising and lowering said beams, thereby to raise and lower the soil-working devices.

15. The combination, with a vehicle-body and its running-gear, of a motor supported by said vehicle, for imparting motion thereto; a gang of soil-working devices comprising two sets; a carrier for each set of devices; a pair of beams pivotally supported on said body; a pair of connectors each having a rotary connection with one of said carriers and a universal connection with one of said beams; and means for shifting said beams thereby to raise and lower the carriers.

16. The combination, with a vehicle-body and its running-gear, of a motor supported by said vehicle, for imparting motion thereto; a gang of disk-shaped soil-working devices comprising two sets, a carrier for each set of devices, a pair of beams pivotally supported on said body; a pair of connectors each having a rotary connection with one of said carriers and a universal connection with one of said beams; a crank-shaft supported on said body and having connection with said beams; and means for operating said crank-shaft thereby to shift the beams and raise and lower said soil-working devices.

17. The combination of a vehicle-body; running-gear therefor; a motor carried by said vehicle and in operative connection with said running-gear; a gang of disk-shaped soil-working devices comprising two sets, means for supporting said devices and comprising a rod supported by said body, and a pair of carriers adjustable on said rod; means for raising and lowering said carriers and comprising a shiftable member; and a connector having a universal connection with said shiftable member and a rotary joint with said carriers.

18. The combination, with a vehicle-body and its running-gear, of a motor supported by said vehicle, for imparting motion thereto; a gang of disk plows comprising two sets; a shiftable carrier for each set of said disks; a pair of beams pivotally supported on said body; a pair of connectors each having a rotary connection with one of said carriers and a universal connection with one of said beams; a weight supported by said beam; a crank-shaft supported on said body and having connection with said beams; a bevel-gear mounted on said shaft; and means for operating said shaft and comprising gear mechanism and a crank.

19. In a motor-driven agricultural implement, the combination, with a vehicle comprising a body or frame, and running-gear supporting the same, of a motor carried by the vehicle for imparting motion to said implement; a gang of disk-shaped soil-working devices supported by said body and comprising two sets; a single means for adjusting the two sets of devices into various positions relative to the path of the vehicle; and a single means for raising and lowering all of said sets of devices together out of and into their working positions, respectively and independently of the vehicle frame or body.

20. The combination, with a vehicle-body and its running-gear, of a motor carried by the vehicle, for imparting motion thereto; two sets of soil-working devices; a carrier for each set; means for raising and lowering said carriers and including gear mechanism; and means for adjusting said carriers into various positions relatively to the path of the vehicle and including gear mechanism, and one of said gear mechanisms comprising a worm and means for operating the same.

21. The combination, with a vehicle-body and its running-gear, of a motor carried by the vehicle, for imparting motion thereto; two sets of disk-shaped soil-working devices; a carrier for each of said sets; means for raising and lowering each of said carriers and comprising a pivotally-supported beam and means for shifting said beam; and means for adjusting said carriers into various positions relatively to the path of the vehicle.

22. The combination, with a vehicle-body and its running-gear, of a motor carried by the vehicle, for imparting motion thereto; two sets of oppositely-disposed disk-shaped soil-working devices; a carrier for each of said sets; means for raising and lowering each of said carriers and comprising a pivotally-supported beam and means for shifting said beam; means for adjusting the carriers into various positions relatively to the path of the vehicle and comprising a pair of connectors; and means for shifting said connectors simultaneously.

23. The combination of a mechanically-driven vehicle provided with one or more sets of soil-working disks; means for raising and lowering each of said sets of soil-working disks and comprising a pivotally-supported member, and means for shifting said member; and means for adjusting each of said sets of soil-working disks into various positions relatively to the path of the vehicle.

24. The combination of a mechanically-driven vehicle provided with one or more sets of soil-working disks; means for raising and lowering each of said sets of soil-working disks and comprising a pivotally-supported member and means for shifting said member; and means for adjusting each of said sets of soil-working disks into various positions relatively to the path of the vehicle, and comprising a shiftable member, and means for shifting said member.

25. The combination of a mechanically-driven vehicle; a plurality of carriers connected with said vehicle; one or more soil-working disks supported by each of said carriers; a connector secured to each of said carriers; and means for shifting said connectors, and thereby the disks, into various positions relatively to the path of the vehicle.

26. The combination of a mechanically-driven vehicle; a plurality of carriers supported thereby; one or more soil-working disks supported by each of said carriers; means for raising and lowering each of said carriers, and comprising a shiftable member; and gearing for actuating said shiftable member.

27. The combination of a mechanically-driven vehicle; a plurality of carriers supported thereby; one or more soil-working disks supported by each of said carriers; means for raising and lowering each of said carriers, and comprising a shiftable member; and rotary means for raising and lowering said shiftable member.

28. The combination, with a mechanically-driven vehicle, of a plurality of carriers supported thereby; one or more soil-working disks supported by each of said carriers; a shiftable member connected with said carriers, a weight in position to control the working of said disks; and means for raising and lowering said shiftable member thereby to raise and lower said disks.

29. In an agricultural implement, the combination, with a frame or body, of one or more sets of soil-working disks having pivotal connection with said body, and also having a sliding movement on the pivot of such connection; means for raising and lowering said disks; and means for adjusting said disks into various positions.

30. The combination of a mechanically-driven vehicle; one or more sets of soil-working disks carried by said vehicle; one or more weights in connection with said soil-working devices; means for raising and lowering said disks, and comprising a horizontally-located shiftable member; and rotary means for raising and lowering said member and thereby the disks.

31. The combination of a mechanically-driven vehicle; one or more sets of soil-working devices carried by said vehicle; one or more weights in connection with said soil-working devices; and means including gear mechanism for adjusting said disks into various positions relatively to the path of the vehicle.

32. The combination of a mechanically-driven vehicle; one or more sets of soil-working disks; one or more weights in connection with said soil-working disks; means including gear mechanism for raising and lowering said disks; and means including gear mechanism for adjusting said disks into various positions relatively to the path of the vehicle.

33. The combination of a mechanically-driven vehicle provided with one or more sets of soil-working disks; means for adjusting said disks into various positions relatively to the path of the vehicle; means for raising and lowering said disks and including a shiftable member; and a linkage connection between said shiftable member and said disks and operative to permit the adjustment of said disks into various positions.

34. The combination, with a mechanically-driven vehicle, of one or more sets of soil-working disks having pivotal connection with the vehicle and also having a sliding movement on the pivot of such connection; means for raising and lowering said disks; and means for adjusting the same into various positions.

35. The combination, with a mechanically-driven vehicle including a frame or body, and running-gear supporting the same, of one or more sets of soil-working disks in connection with said vehicle, one or more horizontally-located, pivotally-supported members in connection with said disks; and means for shifting said horizontally-located member or members to raise and lower said disks out of and into their working positions, respectively and independently of said frame or body.

36. The combination, with a mechanically-driven vehicle, of one or more sets of soil-working disks in connection therewith; one or more horizontally-located beams pivotally supported intermediate the end or ends thereof and in connection with said disks; and means for raising and lowering said beam or beams.

RICHARD J. GATLING.

Witnesses:
  F. N. CHASE,
  CHAS. FINKLER.